Patented Feb. 12, 1935

1,990,961

UNITED STATES PATENT OFFICE 1,990,961

PROCESS OF OBTAINING VITAMIN B

Elmer H. Stuart, Indianapolis, Ind., assignor to Eli Lilly and Company, Indianapolis, Ind., a corporation of Indiana No Drawing. Application April 10, 1933, Serial No. 665,334

10 Claims. (Cl. 167—81)

It is the object of my invention to purify and concentrate vitamin B; and more particularly to provide a new process for removing vitamin B from fuller's earth, on which it has been adsorbed.

By vitamin B as used herein I mean the antineuritic and anti-beriberi vitamin which in another system of nomenclature is referred to as vitamin B1. The anti-pellagric vitamin G, which in that other system of nomenclature is referred to as vitamin B2, is not amenable to any substantial extent to my process.

Vitamin B is obtainable from a number of sources, of which perhaps those most commonly used are rice polishings, yeast, and wheat germs. Rice polishings are most desirable as a source of this vitamin, because of their relatively low cost.

Processes are known and in use for concentrating vitamin B from its sources. Among such processes are those which involve adsorbing the vitamin at various stages of procedure on such adsorbing materials as fuller's earth; of which perhaps one of the most efficient is Lloyd's reagent.

After the vitamin B is adsorbed on the fuller's earth, such as Lloyd's reagent, it is usually desirable in the further procedure to remove it therefrom. This has been tried in various ways. It has been found impracticable to remove it from fuller's earth by weak acids; as the adsorption on the fuller's earth is ordinarily from a weak acid solution.

Therefore, the usual and accepted way of removing vitamin B from fuller's earth has been by treating the fuller's earth on which vitamin B is adsorbed with dilute alkaline solution, as of hydroxide of ammonium, sodium, potassium, barium, or calcium. But the resultant alkaline solution of the vitamin is very unstable, as the vitamin tends to be destroyed quite rapidly in alkaline solution. To avoid such destruction, it has been necessary, as soon as the alkaline solution containing the vitamin has been obtained, to neutralize the alkali immediately, as by adding sulphuric acid. In deed, because of the destructive action of the alkali on the vitamin, it has been the usual practice to extract for only three or four minutes with the alkaline extracting solution the fuller's earth on which the vitamin is adsorbed, and then to pass the solution immediately through a Sharples centrifuge to get immediate separation of the solution from the fuller's-earth residue, and then immediately to add the neutralizing acid; so that the vitamin will be subject to the influence of the alkaline solution for as few minutes as possible. Because of the destructive action of the alkaline solution on the vitamin, it is ordinarily possible to make only one extraction of the fuller's earth with such alkaline solution.

In this usual process, at best, there are both a considerable destruction of the vitamin and an incomplete removal of its from the fuller's earth; and a resultant loss of yield in the final product.

In addition, because of the reaction between the alkaline solution and the neutralizing acid, the extracted product after acidulation contains a contaminating salt, such as sodium sulphate for instance; which must be removed, usually with some loss and always at some cost.

I have discovered that it is possible to remove vitamin B from fuller's earth with mineral acids, of the class consisting of hydrochloric acid and sulphuric acid. To obtain such removal effectively, it is necessary that the acid be fairly highly concentrated—of a concentration at least as great as 5%. More complete removal is obtained with even higher concentrations, desirably up to 10% or 15%, with hydrochloric acid for example. If alcohol is present, at about 50% alcohol concentration for example, it is possible to obtain effective removal with lower acid concentrations than is possible in water solutions.

By the removal of the vitamin from the fuller's earths by a concentrated acid in this way, I not only avoid the destruction which occurs when such removal is by an alkaline solution, for vitamin B appears to be substantially stable in acid solution, but also get a more complete removal of the vitamin than with an alkaline solution; and I can repeat the extraction of the fuller's earth with the acid several times if desired. In consequence, the yield of vitamin B removed from the fuller's earth is often substantially double that obtained when the removal is by an alkaline solution; and usually exceeds 75% of the theoretical amount, as against an average of about 40% to 50% when the removal is by an alkaline solution. In addition, the step of neutralizing the alkaline solution that was necessary in previous processes is omitted entirely; a more highly concentrated vitamin is obtained; and if hydrochloric acid is the acid used, the contamination of the vitamin by salts, such as result from the neutralization, is avoided.

The following is an example of my process; and for completeness gives the whole process of extraction starting with the initial source—in this instance rice polishings:

35 pounds of rice polishings are extracted with 30 gallons of acidulated water, made slightly acid as by the addition of one pint of C. P. hydrochloric acid, and desirably containing about 20% alcohol as a preservative. If alcohol is used, it may be ethyl alcohol, or a suitably denatured alcohol such as ethyl alcohol containing 5% to 10% methyl alcohol. The rice polishings and the extracting solvent are mixed intermittently for two days, as in a mechanical mixer, allowed to stand over night, and the extract separated from the solid residue the next morning. If desired, the extraction may be repeated on the solid residue, and the two extracts mixed. The combined extract has a hydrogen ion concentration of about pH 4.5, and contains vitamin B extracted from the rice polishings.

To this extract, after it has been filtered clear, I add while stirring about half a pound of Lloyd's reagent; intermittently mix for a day; allow to stand over night; and decant the supernatant liquid the next morning. The residue, Lloyd's reagent, has adsorbed vitamin B from the initial extract. To make sure that substantially all the vitamin is adsorbed, an additional half pound of Lloyd's reagent may be added to the decanted liquid, mixed intermittently for a few hours, allowed to stand for at least three hours, and then decanted; and the residue thus obtained of Lloyd's reagent may be added to that obtained from the first decanting.

This process of obtaining vitamin B adsorbed on Lloyd's reagent is old, and provides the starting material for my process. It is from this vitamin-containing Lloyd's reagent that vitamin B has heretofore been removed by alkaline extraction; but from which I remove vitamin B by acid extraction. The following are three examples of my removal process.

*Example 1*

To 15 grams of the Lloyd's reagent on which vitamin B is adsorbed I add 200 cc. of hydrochloric acid—10% to 36% acid concentration—and mix for an hour or two. The temperature rises slightly, usually about a degree centigrade. The mixture is then filtered. The filtrate contains vitamin B extracted from the Lloyd's reagent. For more complete extraction, the residue of Lloyd's reagent after the filtration may be extracted again with hydrochloric acid, if desired several times, and the extracting acid may be used in varying concentrations from about 5% to 10% up to the maximum of 36%. If there are several extractions of the Lloyd's reagent, the several filtrates may be combined. The filtrate, or the combined filtrates, are evaporated in vacuo to dryness; and the residue so obtained is then desirably extracted with water to obtain the vitamin B free from water-insoluble matter, and the extract then re-evaporated to dryness in vacuo.

*Example 2*

To one kilogram of the Lloyd's reagent on which vitamin B is adsorbed I add a mixed solvent consisting of one liter of hydrochloric acid of about 36% acid concentration, one-third of a liter of water, and two liters of alcohol; and mix for two hours, allow the mixture to stand over night, and then separate the extract from the solid residue, as by filtration. Preferably I repeat this extraction of the Lloyd's reagent twice, or three extractions in all; and I mix the three extracts, to make a total extract of about ten liters. This extract is evaporated in vacuo to dryness. The residue so obtained is taken up in about 1.5 liters of water, desirably warmed to about 50° C. The solution thus obtained is quite acid; and I add sufficient sodium hydroxide to obtain a hydrogen ion concentration of about pH 5. A precipitate is produced by this; and it is suitably separated from the supernatant liquid, as by filtration, and washed with water to remove as much as possible of any vitamin B which adheres. The washings may be added to the filtrate obtained by the filtration following the addition of the sodium hydroxide. The washed precipitate contains a very slight amount of the vitamin B activity, perhaps 3% of the original; but the greater part of the original vitamin B potency is in the filtrate, which is now evaporated in vacuo to dryness.

*Example 3*

Instead of using hydrochloric acid in Examples 1 and 2, I may use sulphuric acid, conveniently of about 8% to 19% concentration. For instance, if I use the sulphuric acid with alcohol as the solvent, I extract say 15 grams of the Lloyd's reagent on which vitamin B is adsorbed by a mixed solvent consisting of 5 cc. of water, 30 cc. of a suitably denatured alcohol, and 1.5 cc. of concentrated sulphuric acid. I mix the Lloyd's reagent with this combined solvent for about three hours, permit the mixture to stand over night, and then separate the liquid from the solid residue, as by filtration. I prefer to make second and third extractions with similar amounts of the same solvent; and to mix the three extracts. Since the sulphuric acid is not volatile, I now add sufficient sodium hydroxide to neutralize most of it; to obtain a hydrogen ion concentration close to neutrality, although desirably still barely on the acid side of pH 7. The sodium sulphate produced by the reaction separates out nearly completely from the alcohol solution; and is suitably removed, as by filtration. The remaining liquid is now evaporated in vacuo to remove the denatured alcohol used; but I deem it preferable not to evaporate to complete dryness, for if some of the sulphuric acid used remains unneutralized and the evaporation is carried too far the resultant very high concentration of the acid may destroy the vitamin B.

The final products of all these examples contain vitamin B in highly concentrated form, and are suitable for therapeutic use. The solid residue obtained in Examples 1 and 2 may be orally administered in that solid form; in which form, even without preservatives, they can be kept for long periods without material loss in potency. Also, the final solids obtained in Examples 1 and 2 can be dissolved in water to obtain a solution; and those solutions, as well as the final solution obtained in Example 3, can be effectively administered either orally or by injection. Such solutions may be put up in ampoules for convenient distribution. If the solutions are not to be administered immediately on preparation, it is desirable to add a suitable preservative thereto, such for instance as alcohol or cresol in suitable concentration for preservation.

I claim as my invention:

1. The process of removing vitamin B from fuller's earth on which such vitamin has been adsorbed, which consists in extractions such fuller's earth with an acid solution of the class consisting of hydrochloric and sulphuric acids and of an acid concentration of at least 5%, and partially neutralizing the acid solution to a hydrogen ion concentration of between pH 5 and pH 7.

2. The process of removing vitamin B from fuller's earth on which such vitamin has been adsorbed, which consists in extracting such fuller's earth with hydrochloric-acid solution having an acid concentration of the order of from 10% to 15%, and partially neutralizing the acid solution to a hydrogen ion concentration of between pH 5 and pH 7.

3. The process of removing vitamin B from fuller's earth on which such vitamin has been adsorbed, which consists in extracting such fuller's earth with hydrochloric-acid solution having an acid concentration of at least 5%, and then removing the hydrochloric acid by vacuum distillation, dissolving in water the residue so obtained, and adding an alkaline reagent in suitable amount to produce a hydrogen ion concentration of between pH 5 and pH 7.

4. The process of removing vitamin B from fuller's earth on which such vitamin has been adsorbed, which consists in extracting such fuller's earth with hydrochloric-acid solution having an acid concentration of at least 5%, and partially neutralizing the acid solution to a hydrogen ion concentration of between pH 5 and pH 7.

5. The process of removing vitamin B from fuller's earth on which such vitamin has been adsorbed, which consists in extracting such fuller's earth with a water-alcohol mixture acidulated to an acid concentration of at least 5% with an acid of the class consisting of hydrochloric and sulphuric acids, and partially neutralizing the acid solution to a hydrogen ion concentration of between pH 5 and pH 7.

6. The process of removing vitamin B from fuller's earth on which such vitamin has been adsorbed, which consists in extracting such fuller's earth with a water-alcohol mixture acidulated to an acid concentration of at least 5% with hydrochloric acid, and partially neutralizing the acid solution to a hydrogen ion concentration of between pH 5 and pH 7.

7. The process of removing vitamin B from fuller's earth on which such vitamin has been adsorbed, which consists in extracting such fuller's earth with a water-alcohol mixture acidulated to an acid concentration of at least 5% with hydrochloric acid, and then removing the hydrochloric acid by vacuum distillation, dissolving in water the residue so obtained, and adding an alkaline reagent in suitable amount to produce a hydrogen ion concentration of between pH 5 and pH 7.

8. The process of removing vitamin B from fuller's earth on which such vitamin has been adsorbed, which consists in extracting such fuller's earth with an acid solution of the class consisting of hydrochloric and sulphuric acids and of an acid concentration of the order of from 10% to 15%, and partially neutralizing the acid solution to a hydrogen ion concentration of between pH 5 and pH 7.

9. The process of removing vitamin B from fuller's earth on which such vitamin has been adsorbed, which consists in extracting such fuller's earth with sulphuric-acid solution having an acid concentration of at least 5%, and partially neutralizing the acid solution to a hydrogen ion concentration of between pH 5 and pH 7.

10. The process of removing vitamin B from fuller's earth on which such vitamin has been adsorbed, which consists in extracting such fuller's earth with a water-alcohol mixture acidulated to an acid concentration of at least 5% with sulphuric acid, and partially neutralizing the acid solution to a hydrogen ion concentration of between pH 5 and pH 7.

ELMER H. STUART.